Sept. 14, 1937.　　　F. A. FURLONG　　　2,093,239

HEATING APPARATUS

Filed Aug. 26, 1935

Inventor
Francis A. Furlong
by McConkey & Booth
Attorneys

Patented Sept. 14, 1937

2,093,239

UNITED STATES PATENT OFFICE 2,093,239

HEATING APPARATUS

Francis A. Furlong, River Forest, Ill., assignor to Autogas Corporation, Chicago, Ill., a corporation of Delaware Application August 26, 1935, Serial No. 37,868

1 Claim. (Cl. 158—1)

This invention relates to heating apparatus, and is illustrated as carried out in a conversion burner utilizing a hollow structure built up of ceramic radiants. In a burner of this type the radiants are supported above the burner, and the hot and burning gases from the burner pass out through openings between the radiants and heat the radiants to incandescence.

An object of the invention is to arrange and construct a structure of this type to direct practically all of the radiant heat where it will be most effective. I desire to direct practically no heat at all against the furnace door, for example, and to concentrate the heat upon the water or air jacket of the furnace.

This I accomplish in a simple and very effective manner by arranging the radiants, where the heat transmission is not desired, as a solid blank wall without openings. This forces all of the hot gases through the openings between the radiants on the sides where maximum heat transfer is desired, thus utilizing practically all of the heat in the gases in raising those radiants to incandescence, leaving the solid wall of radiants on the other side relatively cool.

The above and other objects and features of the invention, including various novel combinations and desirable arrangements, will be apparent from the following description of the illustrative embodiment shown in the accompanying drawing, in which.

Figure 1:
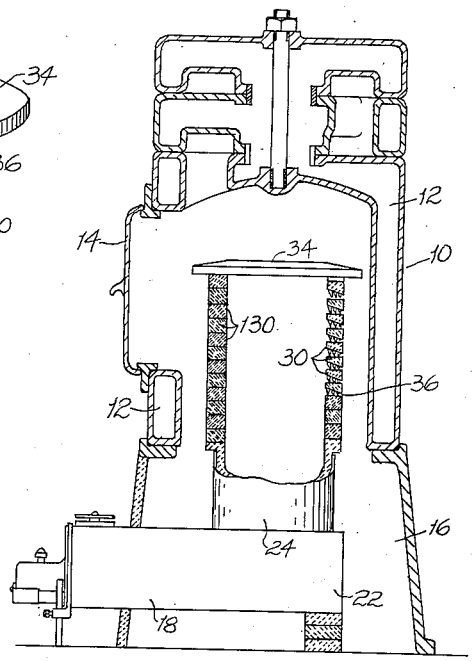
Figure 1 is a section through a heating furnace embodying my invention.

Figure 1 illustrates a furnace 10 having passages 12 for air or water to be heated, a door 14, and an ashpit 16 in its base.

A conversion burner 18 is shown extending through one side of the ashpit 16. This burner includes fuel and air mixing means 20 inside of an elongated rectangular burner box 22, arranged to burn the fuel-air mixture inside of a hollow ceramic radiant structure carried by a base 24 supported by the burner box.

The burner may be substantially as described in Cunningham Patent No. 1,956,857, granted May 1, 1934. The radiant structure described below is generally of the type described in Wetherbee Patent No. 1,919,285, granted July 25, 1933.

Figure 2:
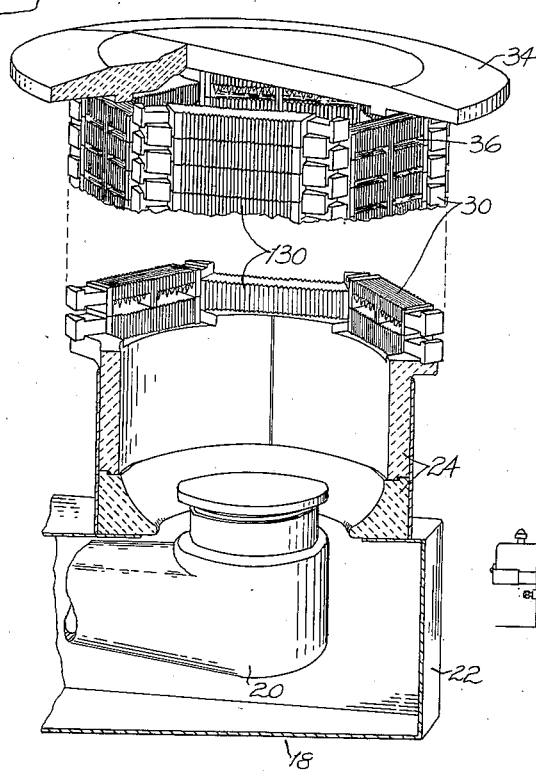
Figure 2 is a view on a larger scale, partly in side elevation and partly in vertical section, of the radiant structure and the part of the burner which supports it.
Figure 3:
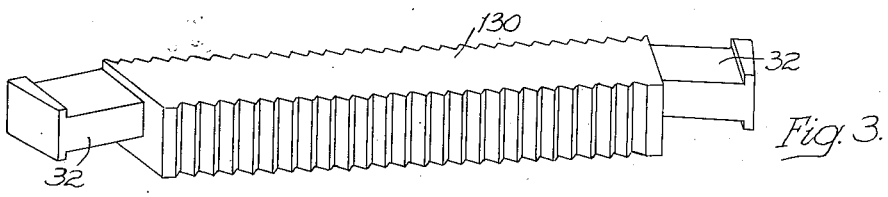
Figure 3 is a perspective view of one of the radiants used in building up the solid blank wall section.
Figure 4:
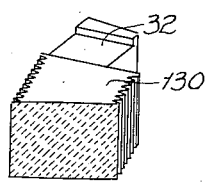
Figure 4 is a section through the radiant.

The novel radiant structure is built up as shown in Figure 2, generally like a log cabin, by radiants 30 and 130 of ceramic material, one of which is shown in Figure 3. These radiants may have reduced-section ends 32 interlocking with each other. A ceramic cover 34 completes the structure.

Where maximum radiation is desired, opposite the passages 12, the radiants 30 are formed, as described in the Wetherbee patent, to provide slits of converging passages 36 therebetween. The hot and burning gases passing through these passages heat the adjacent radiants 30 to incandescence, and the heat is transferred substantially without loss, by radiation, to the surfaces to be heated.

However, it would be a waste of heat to transfer heat to the door 14, and to other surfaces where there is no heat-transfer medium like the air or water in passages 12. According to an important feature of the present invention, those parts of the radiant structure opposite such surfaces are built up as solid blank walls, without openings, by using radiants 130 shaped to fit solidly against each other.

While one illustrative embodiment has been described in detail, it is not my intention to limit the scope of the invention to that particular embodiment, or otherwise than by the terms of the appended claim.

I claim:

A heating furnace having peripheral portions adapted to contact a heat transfer medium, and at least one peripheral portion having no contact with such medium, a burner within the furnace, and a hollow ceramic radiant structure supported above the burner, said structure being built up of radiants placed one upon another and some of which have openings therebetween for the passage of hot gases from the burner and which are rendered incandescent by such gases, and others of which fit flat against each other to form a solid wall preventing the passage of said gases and which therefore remain cooler than said incandescent radiants, those radiants forming a solid wall being adjacent said last named peripheral portion.

FRANCIS A. FURLONG.